United States Patent [19]

Conaghan et al.

[11] Patent Number: 4,929,478
[45] Date of Patent: May 29, 1990

[54] PROTECTIVE FABRIC SLEEVES

[75] Inventors: Thomas B. Conaghan, Rock Hall, Md.; Harry F. Gladfelter, Phoenixville, Pa.; Joseph S. Kite, III, West Chester, Pa.; Marie C. Tresslar, Plymouth Meeting, Pa.

[73] Assignee: The Bentley-Harris Manufacturing Company, Lionville, Pa.

[21] Appl. No.: 208,305

[22] Filed: Jun. 17, 1988

[51] Int. Cl.⁵ .............................................. F16L 11/00
[52] U.S. Cl. .................... 428/35.1; 428/36.1; 428/36.3; 428/225; 428/377
[58] Field of Search .............. 428/34.9, 35.1, 377, 428/36.1, 36.3, 225; 138/119, 129; 174/108, DIG. 8; 264/281, DIG. 40

[56] References Cited

U.S. PATENT DOCUMENTS

| | | |
|---|---|---|
| 1,924,576 | 8/1933 | Szegraci . |
| 2,365,952 | 12/1944 | Hanson . |
| 2,393,058 | 1/1946 | Pierce et al. . |
| 2,525,285 | 10/1950 | Collins . |
| 2,785,442 | 3/1957 | Boggs . |
| 3,234,970 | 2/1966 | Baker et al. ......................... 138/129 |
| 3,243,328 | 3/1966 | Britton et al. . |
| 3,364,289 | 1/1968 | Campbell . |
| 3,466,210 | 9/1969 | Wareham . |
| 3,499,072 | 3/1970 | Helling et al. ...................... 264/151 |
| 4,283,362 | 8/1981 | Gold . |
| 4,539,249 | 9/1985 | Curzio . |
| 4,788,089 | 11/1988 | Skipper ............................... 428/35.1 |

Primary Examiner—Marion C. McCamish
Attorney, Agent, or Firm—John T. Synnestvedt; Charles H. Lindrooth

[57] ABSTRACT

Sleeves formed of fabrics comprised wholly or in part from engineered plastic materials which are settable by heat to be biased to a specific sleeve geometry are disclosed. One form of sleeve illustrated involves heat-setting plastic material to a helical configuration by wrapping an elongated strip of the fabric material helically on a mandrel, heating the material while in the helical configuration, and thereafter cooling the material so that is has a permanent helical set with the side edges of the material in overlapping relation. the sleeves so formed may be collapsed into a short cylinder for packaging. In use, the compressed cylinder is allowed to expand lengthwise over an elongate object or objects to effect a jacketing of the same without additional assembly effort. A second form of sleeve disclosed involves setting the fabric material in tubular form, wherein the product is formed to have side edges abutting one another or in overlapping relation. A product so formed snap fits over an elongated substrate without the need for other attaching means. Sleeve products may have a circular, rectangular, square or triangular cross-section or various combinations of these cross-sections.

12 Claims, 2 Drawing Sheets

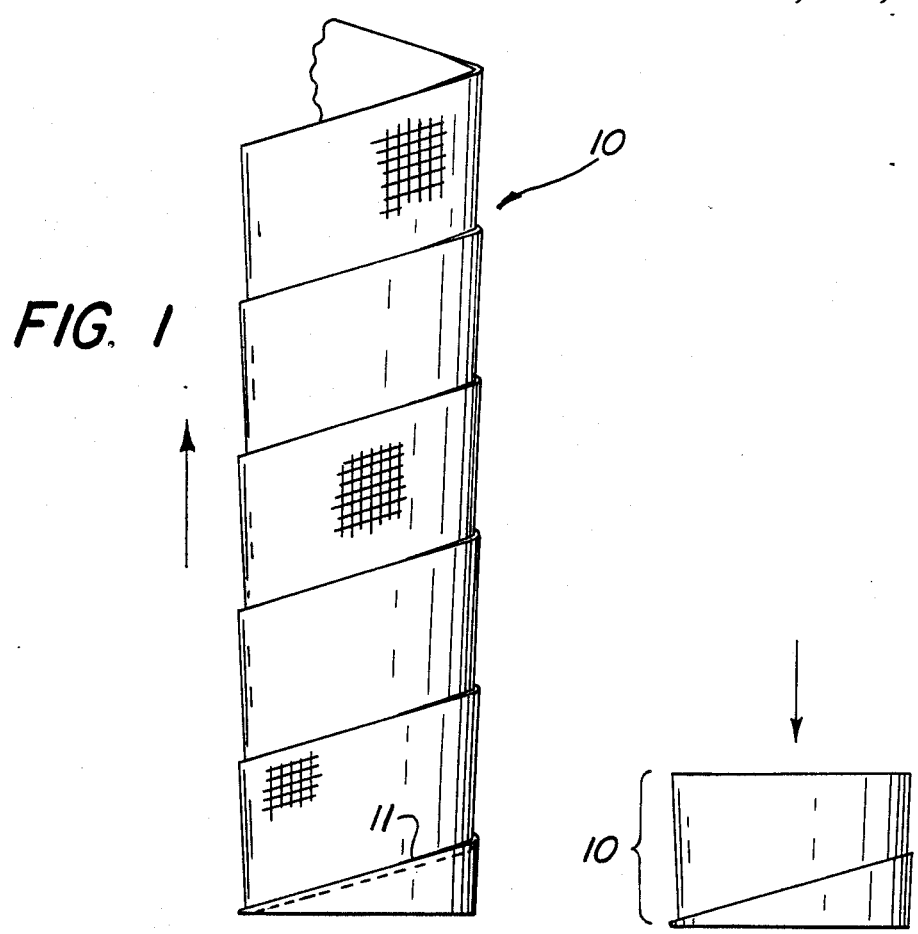

PROTECTIVE FABRIC SLEEVES

FIELD OF THE INVENTION

This invention relates to sleeves made from fabric and methods of making the same. More particularly, the invention relates to sleeves formed from fabrics comprised of engineered plastic filamentary materials in resilient tubular configuration for bundling and protecting elongated articles such as wires and hoses.

BACKGROUND OF THE INVENTION AND PRIOR ART

Encasing cables, hoses and other elongated flexible articles in tubular sleeves, particularly for the purpose of providing abrasion resistance thereby maintaining the mechanical and electrical properties of the article, is well-known in the art. Examples of such sleeving are those sold by The Bentley-Harris Manufacturing Company under the registered trademark EXPANDO. The EXPANDO sleeving is lightweight and provides tough physical protection for cable assemblies, hoses, wire harnesses and the like. The open construction of this type of product is of advantage over a solid material in that it breathes and prevents the entrapment of moisture. In addition, this type of sleeving maintains the bundled elongated articles in clean, compact condition and, depending upon the materials employed, may provide electrical shielding or protection from high temperatures, and has numerous other advantages well recognized in the art. The present invention provides advantages over the sleeving just described such as reduction in costs and simplified installation of the sleeving over multiple cables and other elongated articles and the ability to provide for multiple wire breakouts in a simple and effective fashion.

SUMMARY AND OBJECTS OF THE INVENTION

According to the invention, a resilient plastic material that has the ability to assume a set or bias, as by application of heat or pressure or by chemical modification is woven or braided to form flat fabric. Preferably a sleeve is formed from an elongated strip or ribbon of the woven material which is given a set or memory as by application of heat to a tubular configuration by forming the ribbon as a helically-wound strip with the edges of the strip in overlapping relationship when the strip is in the extended form. In another form of the invention, a woven or braided ribbon of heat-settable engineered plastic material is either first formed into a tube, heat set by passage through a heated die and cut lengthwise, or is heat set on a mandrel, with its overlapped side edges biased to the closed position.

An advantage of either form of the invention is the ease of use of the sleeving. In the case of the overlapping helical form of the invention, the sleeve in helical form can be compressed longitudinally into itself to form a multi-layered or turned spiral package having a cylindrical external shape with a length equal to the width of the fabric material forming the sleeve. This compressed cylinder can be placed over an elongated object or bundle of objects several feet long. When the forces acting to maintain it in compressed form are released, the biasing force on the preset spiral will cause the product to extend longitudinally to cover the elongated substrate with no additional assembly. When the ends of the substrate are inaccessible, the product may be helically wrapped on the substrate. The biasing forces will thereafter act to hold the sleeve in place. Either configuration also has the advantage of allowing for a multiplicity of breakouts of wires or tubes where required. Accordingly, it is an object of the invention to provide an improved sleeve for enclosing elongated articles, such as cables and the like, in which assembly of the sleeving over the substrate article is facilitated and breakouts are permitted.

A further object is the provision of sleeving which can be readily bent to follow a relatively sharp radius without kinking or opening up along its longitudinal seam.

A still further object of the invention is the provision of a sleeving product which facilitates the breakout of wires, cables or other elongated articles bundled within the sleeving.

The foregoing and various other objects of the invention will become more fully apparent from the brief description of the drawings and detailed description of the invention which follow.

BRIEF DESCRIPTION OF THE DRAWINGS

FIG. 1 illustrates a preferred form of sleeve incorporating the principles of the present invention;

FIG. 2 shows the sleeve of FIG. 1 wherein the product is axially compressed to form a multi-turned cylinder having a length equal to the width of the fabric strip forming the sleeve;

FIG. 3 is an end view of the product illustrated in FIGS. 1 and 2;

FIG. 4 is a perspective view of an alternative form of the present invention;

DETAILED DESCRIPTION OF THE PREFERRED EMBODIMENTS OF THE INVENTION

Figure 5:
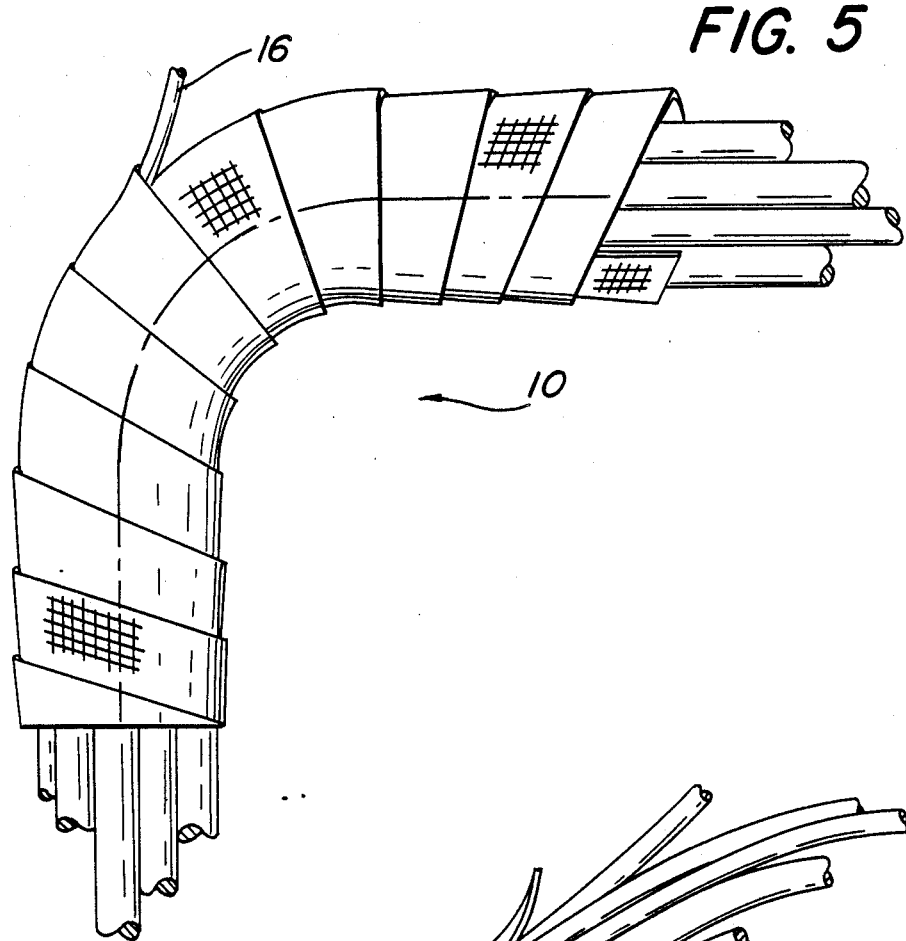
FIG. 5 is a fragmentary view of a portion of an assembled wiring harness using a sleeve formed according to FIGS. 1-3.

With reference to FIGS. 1-6, two embodiments of sleeves are shown formed in accordance with the invention.

According to the invention, the sleeves are made from fabric in ribbon or strip form constructed from engineered plastic materials by shuttle loom, needle loom, scrim, fused lattice or braid techniques. In addition, the objectives of the invention may be achieved by knitting, braiding or weaving articles in tubular form, which are thereafter treated and cut to form sleeves having properties of the present invention. In the context of this invention, "fabric" means any woven, knitted, braided or plaited material made wholly or in part from filamentary materials comprised of engineered plastics. The fabric products utilized are characterized by an open construction which produces sleeves that breathe and prevent entrapment of moisture.

Preferably, the fiber or yarn used is polyester, but it will be appreciated that other members of the family of plastics known as engineered plastics are suitable for use in sleeves formed according to the present invention.

Materials in the family of engineered plastics of the type referred to herein include plastics that have a tensile modulus of greater than 50,000, and in the range from about 50,000 to about 200,000. Examples of engineered plastics are the olefin polymers of which are poly 4-methyl pentene and fluorinated polyolefins for ethylenetetrafluoroethylene copolymers, and vinylidene fluoride polymers, especially polyvinylidene fluoride and blends thereof, for example, the fluorinated olefin blends as described and claimed in British Pat. No. 1,120,131 polyesters, for example, polyethylene terephthalate, polytetramethylene terephathalate for example that are treated as described in U.S. Pat. Nos. 3,968,015; 4,073,830; and 4,113,594, polyphenyleneoxide and -sulphide, blends of polyethylene oxide with styrene, silicone carbonate block copolymers, polyketones, such as polyarylether ketones, for example, those described and claimed in U.S. Pat. Nos. 3,953,400; 4,024,314; 4,229,564; 3,751,398; 3,914,298; 3,956,146; and 4,111,908; and in British Pat. Nos. 1,387,303 and 1,383,393, polysulphones, for example, polyaryl sulphones. polyarylethere sulphones. polyetherimides for example those described in U.S. Pat. No. 3,847,867, polycarbonates especially those derived from bis phenol-A, polyamides especially those described and claimed in U.S. Pat. Nos. 3,551,200 and 3,677,921 and in British Pat. No. 1,287,932, poly ether ether ketone (peek), epoxy resins and blends of one or more of the above-mentioned polymeric materials either with each other or with other polymeric materials. A more detailed discussion of the above materials is found in British Specification No. 1,529,351 which is incorporated herein by reference. It is especially preferred to use polyester as the material for the fiber.

Engineered plastics of the type described may be caused to take a permanent set by forming a product comprised of the plastic material to a specific geometry and then modifying the properties of the material. This is usually accomplished by the application of heat to raise its temperature to a point either above the glass transition temperature or above the softening point in the case of amorphous polymers and thereafter cooling the material. The product thereafter has a permanent set or bias (sometimes called an "elastic memory") in the shape in which it was formed as is wellrecognized by those of ordinary skill in the art. Although the application of heat is the usual and most widely employed method of producing this set or bias, it should also be recognized that other, chemical or physical, methods may sometimes be employed.

Although products formed of monofilaments of engineered plastic materials have been produced which yield excellent results, multifilament yarns may also be employed either entirely or in combination with monofilament materials. Moreover, combinations of engineered plastic materials and yarns or strands or filaments comprised of metals or mineral materials such as glass in fiber form may be used. Blends of different basic monofilaments and combinations of different diameters of monofilaments will be of advantage for certain applications.

FIGS. 1-3 show a sleeve 10 of preferred form for carrying out the principles of the invention. The sleeve of FIGS. 1-3 is preferably formed from woven strip material comprised of polyester monofilament typically of about 0.010 inches in diameter. The sleeve is formed to the specific geometry desired as by wrapping the strip material in helical fashion upon a mandrel of the desired diameter of the ultimate product. Preferably, one side edge of the strip overlies the other side edge as can be seen in FIG. 1 at 11. Preferably, the amount of overlap should range from about ten to about fifty percent of the width of the strip when the material is wrapped upon the mandrel, although this may vary somewhat. Subsequent to wrapping, the polymeric material is exposed to heat to bring the material to the softening point. Typically the material is heated by a hot air gun although other heating means may be employed. Thereafter upon cooling, the strip material retains a permanent set so that upon removal from the mandrel it maintains its tubular helical shape with the side edges overlapping one another by the amount stated above. Temperatures and times required to achieve the desired set without destruction of the integrity of the article can be determined for each material selected by a few field trials.

According to the invention, the materials employed are sufficiently resilient so that the helical sleeve may be compressed longitudinally from the extended condition shown in FIG. 1 to the compressed condition of FIGS. 2 and 3, so that the turns fully overlap and form a spiral with the external form of a multi-layered cylinder 12, the length of which is approximately equal to the width of the strip material. Preferably this short cylinder is packed in compressed form for use as required for jacketing of cables, conduits or other elongated substrates. When the cylinder is unpacked and no longer restrained, the biasing forces cause the sleeve to extend to its approximate original length which may be two feet or more. In use, the short cylinder is held against extension by the user, placed over the end of the bundle of elongated articles and is then released to allow the biasing force to cause the sleeve to extend lengthwise over the entire bundle, thus covering or jacketing the bundle with no additional assembly steps.

As can be seen in FIG. 5, an advantage of the helical sleeving of the invention is that the sleeving material can be bent on a relatively tight radius without collapsing or without physical separation of the turns. This characteristic of the product is enhanced by the combined use of the helical configuration and by the inherent flexibility of woven materials. By braiding, the fabric takes on the additional qualities of being radially expandable and axially compressible so that even more flexibility is imparted to the product.

Figure 6:
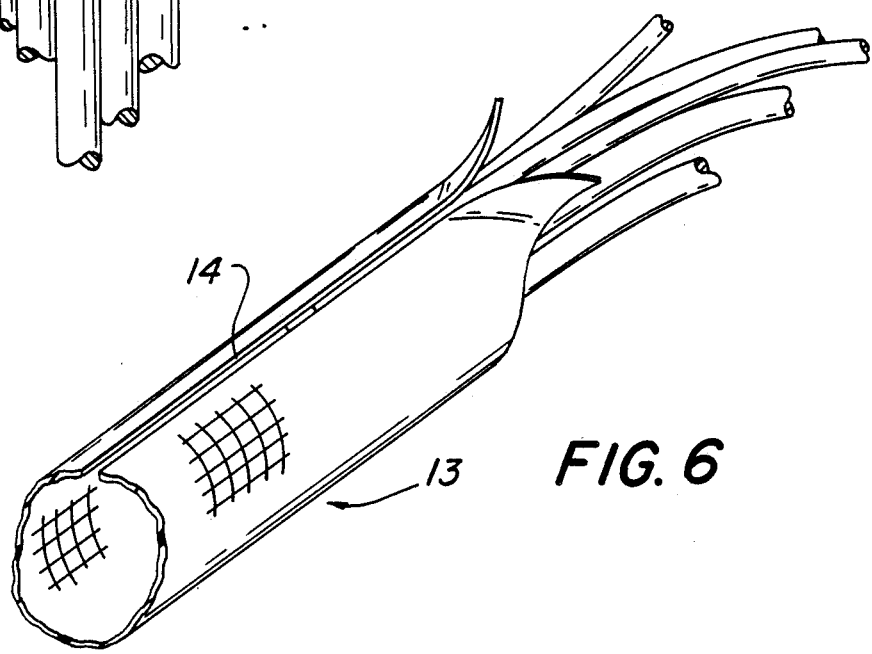
FIG. 6 is a fragmentary view showing partial assembly of a wiring harness using the embodiment of the invention illustrated in FIG. 4.

FIGS. 4 and 6 show a form of the invention in which a tubular sleeve 13 having a lengthwise slit 14 is employed. In accordance with the embodiment shown in FIG. 4, the fabric is set in tubular form as by the application of heat so that it is biased to provide a 360 degree snap fit over a substrate without the need for other attaching means. FIG. 6 shows the application of the tubular material of FIG. 4 to a bundle of elongated wires.

According to the invention, the woven sleeve material is sufficiently resilient so that wire breakout at any point along the sleeve may be easily accommodated. As seen in FIG. 5, one such wire is shown at 16. In the form of the invention shown in FIGS. 1, 3 and 5, wires may be pulled from between the edges of the strip material on any edge point on any turn. The biasing force imparted by the set tends to resiliently urge the material around any wire broken out, thereby restricting the passage of foreign matter into the bundle of wires within the sleeve. Using the form of invention shown in FIGS. 4 and 6, wires may be similarly broken out lengthwise of the overlying edges of the strip material.

Although tubular articles having a substantial cylindrical cross-section are illustrated in the drawings, it should be appreciated that other cross-sections, such as rectangular, square or triangular, may be set into the fabric by the use of dies or mandrels of the desired shape. Various combinations and multiples of these shaped may also be employed.

What is claimed is:

1. An elongated fabric sleeve for the protection of conduit, cable or the like elongated substrate, said sleeve being formed of a resilient heat-settable ribbon comprised of interlaced plastic monofilament material characterized by an open construction, said monofilament material being heat settable to bias said sleeve into a tubular cross-sectional configuration with the side edges of the material being biased into a partial overlapping relationship throughout substantially the entire length thereof.

2. A fabric sleeve according to claim 1 wherein said fabric sleeve is comprised of braided filamentary material.

3. A fabric sleeve according to claim 2 wherein said filamentary material consists of a combination of monofilament and multifilament material.

4. A fabric sleeve according to claim 2 wherein said plastic material is heat biased to a continuous helical configuration with one side edge of the material in overlapping relation with the other side edge throughout substantially the entire length of the sleeve, the heat set being sufficient to induce a biasing force in a direction causing extension of the sleeve to an extended position in which the side edges are in partial overlap, the heat set material having a modulus of elasticity within a range permitting manual compaction of the sleeve from the extended position to a position in which the side edges are substantially in full overlap and further re-expansion to the extended position when the sleeve is unrestrained, the elasticity of the material permitting flexure of the sleeve to allow for breakout of an elongated substrate from between the overlapping side edges of the material.

5. A fabric sleeve according to claim 4 wherein the amount of overlap of the sleeve in the extended position is between about ten percent and about fifty percent of the width of sleeve material.

6. A fabric sleeve according to claim 5 wherein the tubular sleeve has a substantially circular cross-sectional shape.

7. A fabric sleeve according to claim 4 wherein the woven filamentary material comprises a polyester monofilament.

8. A fabric sleeve for the bundling of elongated substrates such as conduit, cables or the like, said sleeve being formed of an elongated strip of resilient heatsettable plastic material woven in an open construction, said material having a tensile modulus of between about 50,000 and about 200,000 p.s.i., said sleeve material being biased to inherently assume a multi-turned helical, resiliently flexible tubular configuration with one side edge being in an overlapping relation with respect to the other side edge, said helically configured sleeve being compressible under forces acting axially to form a substantially cylindrical package with the helical turns in full registry with one another, the sleeve bias acting to return the sleeve to the tubular helical resiliently flexible configuration upon release of the forces acting to form the substantially cylindrical package.

9. A fabric sleeve according to claim 8 wherein said fabric is comprised of a woven monofilament heat-settable plastic material.

10. A fabric sleeve according to claim 9 wherein said sleeve has a circular cross-section.

11. A fabric sleeve according to claim 10 wherein the amount of overlap of the sleeve edge is about ten to about fifty percent of the width of the material when the sleeve is in the tubular configuration.

12. A fabric sleeve for the bundling of elongated substrates, said sleeve being formed of an elongated ribbon of interlaced thermoplastic monofilament material having an open construction, said sleeve material having a modulus of elasticity of greater than 50,000 and being biased to assume a tubular configuration with one side edge being in overlapping relation with the other side edge throughout the entire length thereof, the side edges being separable against the bias to allow for turnout of an elongated substrate at selected locations lengthwise of the sleeve.

* * * * *